Paul M. Cole INVENTOR.

BY

ATTORNEY

Patented Feb. 17, 1948

2,436,201

UNITED STATES PATENT OFFICE 2,436,201

PRODUCTION OF STRAIN-FREE, EXTRUDED SHAPES FROM ORGANIC THERMOPLASTIC MATERIALS

Paul M. Cole, Wilmington, Del., assignor to E. I. du Pont de Nemours & Company, Wilmington, Del., a corporation of Delaware Application June 26, 1943, Serial No. 492,344

3 Claims. (Cl. 18—30)

This invention relates to the production of strain-free, extruded shapes from organic thermoplastic materials and, more particularly, to the production of strain-free, thermally stable extruded rods and sheets from organic thermoplastic material free of volatile solvents.

Heretofore, thermoplastic compositions which contain no solvent, have been extruded at elevated temperatures and pressures. Such compositions ordinarily exhibit tackiness at the point of extrusion and this has caused considerable difficulty in the handling of the extruded shape. Further, in this operation as carried out heretofore, occluded gases and vaporizing plasticizers and the plastic itself have a tendency to expand as the hot compressed composition leaves the extrusion die and this results in an objectionable interior bubble formation in the extruded body. Previous means proposed for the arresting of this expansion and the elimination of tackiness of the extruded shape at the point of extrusion have resulted in a product characterized by its internal strain and thermal instability.

In the production of molding powder heretofore from organic thermoplastic material, it has been common practice to comminute colloided sheets or chunks of the organic thermoplastic material by mechanical means. This technique usually resulted in a wide variety of particle sizes ranging from fines to the maximum sizes allowable, generally one-quarter inch cubes. The fines have been objectionable in such molding compounds as they present difficulties in the molding of uniform articles.

An object of the present invention is to provide a process of producing from organic thermoplastic material extruded shapes which are strain-free and thermally stable; also, uniformly subdivided molding materials of similar characteristics. A further object is to provide a process for the formation of such strain-free, thermally stable shapes by an extrusion process from an organic thermoplastic material which contains no solvent. A still further object is to provide an extrusion process for the production of strain-free, thermally stable and uniformly subdivided molding material from an organic thermoplastic material which, under the conditions of the extrusion process, is tacky and has a tendency to expand as extruded. Another object of the invention is to provide a method for producing an extruded organic thermoplastic shape or a uniformly subdivided molding material which is free from interior bubbles. A still further object of the invention is to provide an apparatus for carrying out an extrusion process accomplishing the objects noted above. Other objects will be apparent from the description of the invention given hereinafter.

The above objects are accomplished according to the present invention by extruding an organic thermoplastic material substantially free of volatile solvents at elevated temperature in a body of continuous length into a stream of inert fluid having a temperature below the softening point of the thermoplastic material and traveling at high velocity in the direction of travel of the extruded body and maintaining the extruded body in the stream of inert fluid until it has become form-stable. More specifically in the production of molding powder, the plastic is extruded in the form of a rod, generally of circular cross section, and the rod after becoming form-stable is severed into pellets to give a uniformly subdivided molding powder.

The invention further resides in an apparatus for carrying out the above process, such apparatus comprising the combination of a die plate having an orifice therein, means for extruding the thermoplastic material through the orifice in the die plate to form an extruded body of continuous length, a carrier duct positioned adjacent the die plate and aligned with its orifice so that the extruded body may pass through the carrier duct, means for passing a fluid through the carrier duct at high velocity from the end adjacent the die plate to the opposite end thereof, and, if it is desired, means for severing the extruded body into lengths as it passes out of the carrier duct, preferably a rotating knife is employed if a rod is being extruded and it is desired to cut it into uniform pellets for use as a molding powder.

Conveniently, the means for extruding the thermoplastic material through the orifice in the die plate comprises a screw stuffer of the general design commonly used in the plastics industry, although those skilled in the art will appreciate that other extrusion means could be employed as, for example, an hydraulic press. In the commercial production of molding powders, the apparatus of the present invention will normally employ a die plate with a plurality of orifices and a plurality of carrier ducts aligned therewith so that a plurality of rods may be extruded simultaneously and severed by a single rotating knife.

An important feature of the present invention is the stream of high velocity inert fluid into which the plastic is extruded. It has been discovered that through the use of this feature the difficulties heretofore encountered because of the tackiness of the plastic at the point of extrusion are entirely eliminated and that the tendency of the extruded plastic to expand with the resultant objectionable bubble formation is also overcome, thus enabling the production of an extruded shape which is strain-free and thermally stable.

The invention will be more particularly described with reference to the drawing forming a part of the application and in which.

Figure 1:
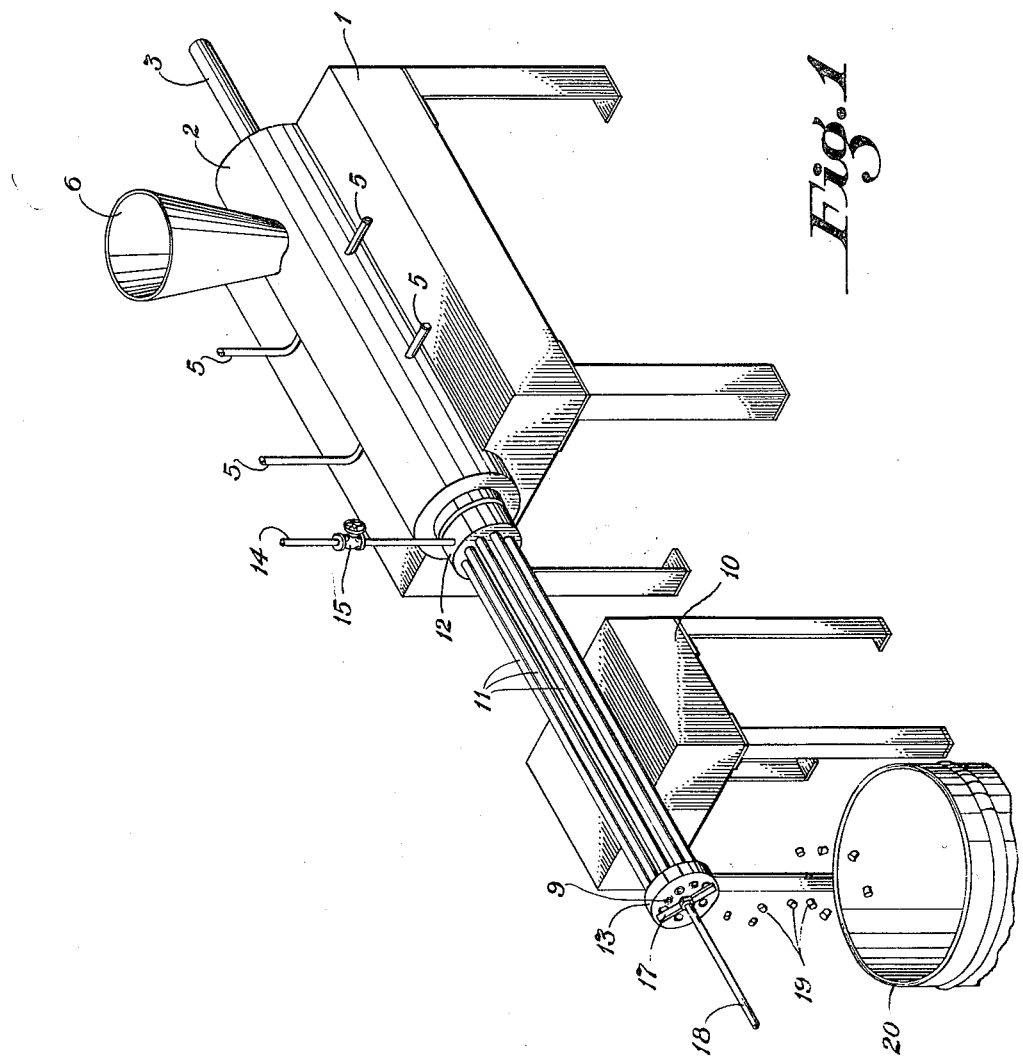
Fig. 1 is a perspective view, more or less diagrammatic, of an apparatus for the manufacture of molding powder according to the present invention.
Figure 2:
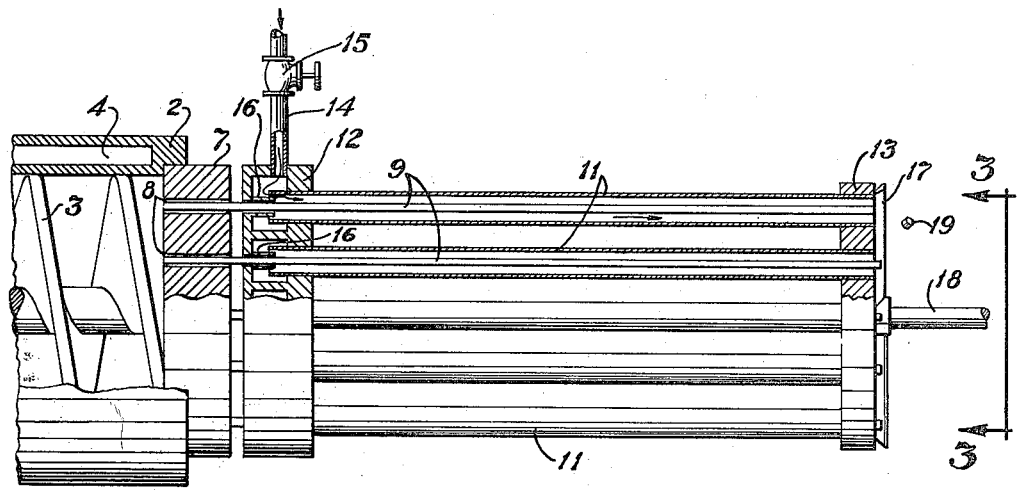
Fig. 2 is an enlarged side elevation of a portion of the apparatus shown in Fig. 1, parts being broken away for purposes of illustration.
Figure 3:
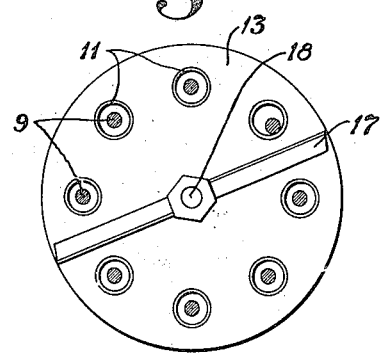
Fig. 3 is an end elevation of the apparatus shown in Fig. 2 looking in the direction of the arrows 3, 3 of Fig. 2.

Referring to Figs. 1, 2, and 3, wherein like reference numerals refer to like parts, the apparatus illustrated comprises a supporting frame or table 1 which carries a screw stuffer for extruding a thermoplastic material. This screw stuffer consists of the cylinder 2 and screw 3 adapted to be rotated through conventional driving means not shown. To heat the thermoplastic material to be extruded, the cylinder 2 is provided with the heating chamber 4 having pipe connections 5 for the circulation of hot water, steam, or other heating fluid therethrough. The thermoplastic material is fed into the screw stuffer through the hopper 6.

Die plate 7 provided with a plurality of orifices 8, is mounted at the delivery end of the cylinder 2; thermoplastic material forced through the orifices 8 by the screw 3 is formed into strands 9 of continuous lengths. Adjacent the die plate 7 and carried on the supporting frame or table 10 is an assembly comprising a plurality of carrier ducts 11 held in position by the headers 12 and 13. This assembly is so positioned that the ducts 11 are aligned with the orifices 8 in the die plate 7 so that the plastic strand extruded through each orifice may travel in straight line through the carrier duct aligned with that orifice. The diameter of the ducts 11 exceeds the diameter of the orifices 8, preferably the diameter of each duct is from two to six times the diameter of the orifice aligned with it, and, hence, exceeds the diameter of the extruded strands so that the strands may pass through the ducts 11 readily. While it is convenient to have the carrier duct assembly spaced from the die plate 7, the space must be substantially negligible as will be hereinafter explained.

While the header 13 is of conventional design and merely serves to hold the ducts 11 in position, the header 12 is provided with an internal chamber connected with the fluid line 14 which is provided with a hand valve 15. As shown in Fig. 2, the wall of the header 12 adjacent the die plate 7 is provided with a series of openings and internally extending collars 16 through which the strands of extruded plastic pass. The collars 16 extend slightly into the ends of the carrier ducts 11, the diameter of the ducts being greater than that of the collars so as to permit a fluid entering the header 12 through the line 14 to pass into the ducts 11 as indicated by the arrow in Fig. 2; the diameter of the collar 16 is, however, only slightly greater than that of the extruded plastic strands so that with the arrangement of the parts as shown, fluid entering the header 12 under pressure will travel through the ducts 11 in the direction of the arrow (Fig. 2) and leave through the open ends of the ducts 11 at the header 13, at the same time drawing a supplemental stream of air in through the collars 16.

The purpose of the arrangement of the header 12 and ducts 11 is to permit a fluid at high velocity to pass through the ducts 11 in the direction of travel of the extruded plastic strands. Due to the frictional forces developed through the velocity difference between a fluid entering the header 12 under considerable pressure and the relatively slowly traveling strands 9, the strands 9 are carried through the ducts 11 under an appreciable tensional pull.

A rotating knife 17 is carried on the shaft 18 which may be driven by conventional driving means, not shown, and this rotating knife 17 operates in vertical plane and at right angles to the line of travel of the plastic strands 9 to sever the strands emerging from the ducts 11 into a plurality of pellets 19 which may be collected in a suitable receptacle 20. The ducts 11 are held securely in position by the header 13; the header 13 presents a flat surface over which the blades of the rotating knife 17 ride. If it is desired to obtain the plastic strands 9 in continuous lengths, the rotary knife 17 could be eliminated and suitable means could be provided for collecting the lengths of extruded strands.

In order that the size of the pellets may be regulated at will and that pellets of equal length may be obtained regardless of the rate of extrusion of the plastic or fluctuations in the rate of extrusion, it is preferred that the rotating knife 17 be driven by means controlled independently of the means for driving the screw 3 of the screw stuffer.

While, for purposes of clarity and illustration, a single line 14 and control valve 15 have been shown for the high velocity fluid so that there is only a single control of the fluid for the plurality of ducts 11, separate fluid lines and controlling means may be provided for each duct 11, the chamber in the header 12 being in such case suitably subdivided to guide the fluid appropriately. Such individual control of the fluid through each duct 11 is in some instances preferable despite the additional cost in building the apparatus as efficient control of the fluid stream is important in operating according to the present invention with maximum success.

Figure 4:
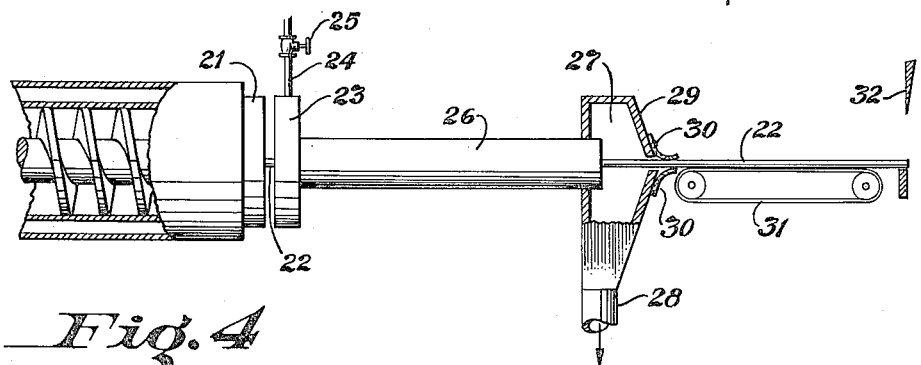
Fig. 4 is a side elevation, more or less diagrammatic, with parts being broken away for purposes of illustration, of an apparatus designed for the manufacture of sheeting in continuous lengths, according to the present invention.

Referring to Fig. 4, there is illustrated an apparatus similar to that heretofore described but particularly adapted for the production of extruded plastic sheets. The screw stuffer is like the one shown in Figs. 1 and 2 but the die plate 21 is provided with a slotted orifice through which a sheet 22 is extruded. The header 23, fluid line 24, valve 25, and carrier duct 26 while functioning as do the corresponding parts of the apparatus shown in Figs. 1, 2, and 3, are modified where necessary to allow for the passage of a sheet rather than a rod. As the sheet 22 emerges from the carrier duct 26 which is of rectangular shape in cross section, it passes through a housing 27 adapted to deflect the fluid passing through the duct 26 and to discharge the fluid through the outlet 28. The wall 29 of housing 27 forms a baffle which is slotted to permit the sheet 22 to pass therethrough. In order to prevent the fluid from passing through the slot along with the sheet 22, a pair of squeegees 30 are provided as shown.

The sheet 22 passes out of the housing 27 and is picked up on an endless belt 31 and carried thereon to a cutter 32 where the sheet is severed into the lengths desired.

The apparatus shown in the various figures of the drawing is merely illustrative and may be modified widely without departing from the present invention. The shape of the extruded body may be varied as desired by changing the shape of the orifice in the die plate. The inert fluid used may be either a liquid or a gas and by "inert" is meant that the fluid should be one that has no solvent or deleterious chemical action on the plastic being extruded. Either water or aqueous solutions or air, for reasons of economy, are the preferred fluids. The apparatus may be arranged so that the extrusion is horizontal, as illustrated in the drawings, or vertical. Other mechanical arrangements may be used to insure the passage of the stream of fluid at high velocity through the carrier ducts and other means of severing the extruded shapes may be employed.

In carrying out the present invention the organic thermoplastic material, free of solvents except plasticizers and the like which are intended to be a permanent part of the composition, is fed into the screw stuffer and extruded at elevated temperature through the die plate into the carrier duct where it is caught in the high velocity stream of fluid. The stream of fluid, the temperature of which is below the softening point of the thermoplastic material whereas the thermoplastic material at the point of extrusion is at a temperature somewhere between a temperature sufficiently above its softening point to permit extrusion and below the temperature at which substantial decomposition of the thermoplastic composition occurs, cools the extruded shape as it passes through the carrier duct and exerts an appreciable tensional pull on it, the combination preventing expansion of and bubble formation in the extruded shape. There is little tendency of the extruded shape to contact the walls of the carrier duct as it travels through. Upon emergence from the carrier duct, the length of the duct, speed of extrusion, and temperature of the inert fluid being balanced so that the extruded shape is form-stable at this point, the extruded shape is severed as desired and handled thereafter without difficulty due to tackiness or any tendency to lose its shape.

The high velocity fluid in this invention has been found to have at least three functions. One function of this high velocity fluid is cooling. Upon extrusion through the orifice in the die plate, the thermoplastic organic composition is in a somewhat super-heated condition. Occluded gases, vaporizing plasticizers and the thermoplastic composition itself under the influence of this super-heat, have a decided tendency to expand. If no effort were made to cool the extruded shape or pellets were to be cut from the thermoplastic strands directly at the die plate, a non-uniformly expanded, bubble containing extruded shape or a non-uniform, low bulk density molding powder would be obtained. However, because of the relatively large velocity difference between the cooler fluid stream and the extruded thermoplastic body, good heat transfer from the plastic to the fluid is obtained. This rapid conduction of heat away from the thermoplastic body lessens considerably the tendency of occluded gases, plasticizer, and the like to cause expansion of the plastic. Also, the surface of the plastic body becomes case hardened which further serves to restrict expansion, especially natural expansion of the plastic.

In the second function, the fluid stream serves to impart tensional forces to the strand. Sudden traverse from the high to low pressure areas causes the organic thermoplastic material to have a trong tendency to expand. The friction between the extruded body and the moving fluid stream is of large enough magnitude to cause an appreciable tension to be applied to the extruded body by the moving fluid. This tension induces a compressive force which acts perpendicularly to the longitudinal axis of the body and opposes expansion of it. This compressive force, combined with rapid cooling, therefore prevents expansion of the extruded body and consequent bubble formation. The tensional forces tend to act as a take-off for the removal of the strand from the die face.

The third function of the fluid stream is one of support. In carrying out the invention the velocity of the fluid must be high enough to maintain the extruded body out of substantial contact with the walls of the carrier duct—that is, the extruded body must not drag along a wall of the carrier duct although no harm results if it occasionally touches the carrier duct as it is bound to do in an apparatus such as shown in Fig. 1 when the rotating knife is severing the extruded strand.

It will be apparent that the relative velocity between the fluid and the extruded body, rather than the absolute velocity of the fluid, is the factor which, in theory, controls the functioning of the fluid in this invention. But practically the extrusion rates for plastics in all instances are so slow compared to the velocity of the fluid in this invention that consideration of the extrusion rate of the plastic may be disregarded. Actually, the absolute velocity of the fluid, particularly in the case of a gas, in the present invention is believed to equal or approach the acoustic velocity but the only practical guide is that the velocity should be high enough to maintain the extruded body out of substantial contact with the walls of the carrier duct.

The inert fluid may be a gas or liquid as stated before. If it is a liquid, other substances may be added to vary its viscosity, density, or other physical properties. In this way excellent control over the magnitude of the friction factor, over-all heat transfer coefficient, and supporting forces are easily obtained by variations of the physical properties of the liquid. In the production of uniformly subdivided molding powder, the fluid stream further serves to force the cut pellets away from the rotating knife.

The fluid may be at any temperature below the softening point of the composition being extruded but it is preferred that it be at substantially room temperature—that is, from 60° F.–100° F. It is important that the extruded body be form-stable before emerging from the carrier duct and with the inert fluid at a relatively low temperature the extruded body will naturally reach that state more quickly and, hence, permit the use of a shorter carrier duct for a given rate of extrusion.

The following examples in which all parts are given by weight, unless otherwise stated, illustrate specific embodiments of the present invention:

Example I

Using the apparatus shown in Figs. 1–3 for the production of uniformly subdivided molding powder, a composition as follows was pelleted:

Composition:
    97.5% interpolymer:
        Methyl methacrylate—90 parts.
        Styrene—10 parts.
    2.0% C–18 alcohol.
    0.5% benzoyl peroxide.

C–18 alcohol comprises a commercial mixture, predominantly octa decyl alcohol, containing small amounts of fourteen, sixteen, eighteen, and twenty carbon fatty acids as impurities.

Conditions under which this composition was extruded were as follows:

Rate—25 lbs. per hour.
Fluid-air pressure—90 lbs. per sq. inch.
No. of strands—2.

| Temp. of die | Temp. of Front Cylinder | Temp. of Back Cylinder |
|---|---|---|
| °F. 260 | °F. 370 | °F. 400 |

Screw speed—13 R. P. M.
Screw diameter—2½".
Knife R. P. M.—1700.
Diameter of carrier ducts—⅜".
Length of carrier ducts—12 inches.
Time of strand in carrier duct—4.2 seconds.
Condition of strand when cut—Semi-soft.
Strand diameter—0.188 inch.
Orifice diameter—0.188 inch.

The molding powder formed under the conditions of this example was uniformly subdivided, bubble-free, and, thermally stable to the extent of ±2% dimensional change when heated unconfined to 120° C. for one hour.

Under the conditions given above, the ratio of gas pressure in pounds per square inch at the duct entrance to the cross-sectional area in square inches of the duct is 812:1 while the ratio of the cross-sectional area of the duct to the cross-sectional area of the extruded strand is substantially 4:1.

Example II

Using the apparatus for the production of uniformly subdivided molding powder, a composition as follows was pelleted:

Composition:
    98.5% interpolymer:
        Methyl methacrylate—90 parts.
        Vinyl acetate—10 parts.
    1.% dibutyl sebacate.
    0.5% benzoyl peroxide.

Conditions under which this composition was extruded were as follows:

Rate—10 lbs. per hour.
Fluid-air pressure—90 lbs. per sq. inch.
No. of strands—2.

| Temp. of die | Temp. of Front Cylinder | Temp. of Back Cylinder |
|---|---|---|
| °F. 210 | °F. 340 | °F. 360 |

Screw speed—13 R. P. M.
Screw diameter—2½".
Knife R. P. M.—450.
Diameter of carrier ducts—⅜".
Length of carrier ducts—6 inches.
Time of strand in carrier duct—3.3 seconds.
Condition of strand when cut—Semi-soft.
Strand diameter—0.150 inch.
Orifice diameter—0.188 inch.

The moulding powder formed under the conditions of this example was uniformly subdivided, bubble-free, strain-free, and thermally stable. Extent of dimensional change on heating above its softening temperature for one hour was ±1%. Pellets of this material which has a fringe value of 6000 p. s. i. showed no more orientation due to internal stress than first order yellow in a ¼ inch thickness. (Cf. "Photoelasticity," Max M. Frocht, John Wiley, New York (1941).)

Under the conditions given above, the ratio of gas pressure at the duct entrance to the cross-sectional area of the duct is the same as in Example I while the ratio of the cross-sectional area of the duct to the cross-sectional area of the extruded strand is substantially 6.25:1.

Example III

Using the apparatus for the production of uniformly subdivided molding powder, a composition as follows was pelleted:

Composition:
    97.5% interpolymer:
        Methyl methacrylate—90 parts.
        Styrene—10 parts.
    2.0% C–18 alcohol.
    0.5% benzoyl peroxide.

Conditions under which this composition was extruded were as follows:

Rate—90 lbs. per hour.
Fluid-air pressure—90 lbs. per sq. inch.
No. of strands—12.

Under the conditions given above, the ratio of gas pressure at the duct entrance to the cross-sectional area of the duct is the same as in Example I while the ratio of the cross-sectional area of the duct to the cross-sectional area of the extruded strand is substantially 2:1.

| Temp. of die | Temp. of Front Cylinder | Temp. of Back Cylinder |
|---|---|---|
| °F. 210 | °F. 340 | °F. 360 |

Screw speed—25 R. P. M.
Screw diameter—3¼".
Knife R. P. M.—630.
Diameter of carrier ducts—⅜".
Length of carrier ducts—59 inches.
Time of strand in carrier duct—65.5 seconds.
Condition of strand when cut—Hard.
Strand diameter—0.265 inch.
Orifice diameter—0.250 inch.

In this example, a small amount of expansion of the strand was allowed by adjustment of operating conditions. However, the expansion was limited so that there was no interior bubble formation.

Results obtained were similar to Example I.

Example IV

Using the apparatus for the production of uniformly subdivided molding powder, a composition as follows was pelleted:

Composition:
- 97.5% interpolymer:
  - Methyl methacrylate—90 parts.
  - Styrene—10 parts.
- 2% C-18 alcohol.
- 0.5% benzoyl peroxide.

Conditions under which this composition was extruded were as follows:

Rate—20 lbs. per hour.
Fluid-air pressure—50 lbs. per sq. inch.
No. of strands—2.

| Temp. of die | Temp. of Front Cylinder | Temp. of Back Cylinder |
|---|---|---|
| °F. 240 | °F. 340 | °F. 360 |

Screw speed—13 R. P. M.
Screw diameter—2½".
Knife R. P. M.—400.
Diameter of carrier ducts—⅜".
Length of carrier ducts—12 inches.
Time of strand in carrier duct—5.2 seconds.
Condition of strand when cut—Semi-soft.
Strand diameter—0.188 inch.
Orifice diameter—0.188 inch.

Results obtained were similar to Example I.

Under the conditions given above, the ratio of gas pressure in pounds per square inch at the duct entrance to the cross-sectional area in square inches of the duct is 452:1 while the ratio of the cross-sectional area of the duct to the cross-sectional area of the extruded strand is substantially 4:1.

Example V

Using the apparatus for the production of uniformly subdivided molding powder, a composition as follows was pelleted:

| Composition: | Parts |
|---|---|
| Cellulose acetate (52.5–55.0% acetic) | 100 |
| Dimethyl phthalate | 31.5 |
| Diethyl phthalate | 13.5 |
| Stearic acid | 0.25 |

Conditions under which this composition was extruded were as follows:

Rate—50 lbs. per hour.
Fluid-air pressure—40 lbs. per sq. inch.
No. of strands—1.

| Temp. of die | Temp. of Front Cylinder | Temp. of Back Cylinder |
|---|---|---|
| °F. 425 | °F. 400 | °F. 350 |

Screw speed—100 R. P. M.
Screw diameter—2".
Knife R. P. M.—1200.
Diameter of carrier ducts—⅜".
Length of carrier ducts—54 inches.
Time of strand in carrier duct—5.7 seconds.
Condition of strand when cut—Very hard.
Strand diameter—0.200 inch.
Orifice diameter—0.250 inch.

The molding powder formed under the conditions of this example was uniformly subdivided, bubble-free, strain-free, and thermally stable. Samples heated above their softening point for one hour showed a dimensional change of less than 1%.

Under the conditions given above, the ratio of gas pressure in pounds per square inch at the duct entrance to the cross-sectional area in square inches of the duct is 362:1 while the ratio of the cross-sectional area of the duct to the cross-sectional area of the extruded strand is substantially 3.5:1.

Example VI

The composition used in Example II was extruded in sheet form with an apparatus as shown in Fig. 4 under the following conditions:

Rate—90 lbs. per hour.
Orifice: ⅛" x 7" slit.

| Temp. of die | Temp. of Front Cylinder | Temp. of Back Cylinder |
|---|---|---|
| °F. 210 | °F. 340 | °F. 360 |

Screw speed—25 R. P. M.
Screw diameter—3¼ inches.
Dimension of finished sheet—7 x ⅛ x 30 inches.
Carrier duct dimensions—½ x 8 x 50 inches.
Time of sheet in carrier duct—71.5 seconds.
Fluid pressure—125 lbs. per sq. inch.
Fluid composition:
- 15% sodium acetate.
- 85% water.

The resulting sheet was clear, strain-free and thermally stable. Its surface was semi-polished.

It will be understood that the foregoing examples are merely illustrative. In its broad phase the invention comprises a process for the formation of strain-free and thermally stable extruded shapes and a strain-free and thermally stable, uniformly subdivided molding material from an organic thermo-plastic material whose composition includes no volatile solvent, by extruding said material by conventional means substantially directly into a duct, through which it passes concurrently with a high velocity fluid until sufficiently cooled and hardened to make further cutting into pellets and/or handling possible.

Aside from difficulties in construction of the apparatus, it would be preferred to have the extruded body pass directly from the extrusion die into the stream of high velocity fluid. However, it is simpler, at least from a construction point, to have a gap between the die plate and the carrier duct assembly; it has been found that a gap of a fraction of an inch or so creates no difficulties although, clearly, a gap of sufficiently great proportions that the extruded body could swell to a considerable extent before entering the stream of high velocity fluid, would result in the loss of much of the advantage gained by the present invention.

The present invention is generally applicable to plastic materials which are tacky and tend to expand upon extrusion, but it has been particularly designed for and is especially advantageous when used in conjunction with organic thermo-plastic molding material extruded without benefit of solvent. The primary ingredient of such molding material will ordinarily be a synthetic or natural resin or a cellulose derivative. Synthetic resins well adapted for use in the present invention include polymerized acrylic and alpha substituted acrylic acid derivatives such as the alkyl esters of acrylic and methacrylic acids, polyvinyl alcohol, and derivatives thereof, polymerized aliphatic hydrocarbons, and polystyrene. Cellulose derivatives which may advantageously be used in this invention include cellulose esters of organic acids such as cellulose acetate and propionate, cellulose mixed esters, and cellulose ethers such as ethyl cellulose. The aforementioned plastics may be used in mixtures with one another and with other plastic materials. Plasticizers, coloring agents, catalysts, fillers and other modifiers may form a part of the composition.

The merits of the apparatus are more apparent when there is used therewith a plastic composition formed by mixing together at room temperature various ingredients including an organic thermoplastic materials, such as methyl methacrylate, and with such proportions of plasticizers and other modifiers that the mixture is a homogeneous colloid at the elevated temperature of extrusion. Whereas it may be necessary to pre-colloid certain compositions on a roll mill prior to extrusion, in order to obtain a completely homogeneous composition, compositions which are colloided to the homogeneous state in the extrusion machine work equally well in the invention.

This invention is particularly applicable to the process in which a composition comprising plasticized, solvent-free, polymerized methyl methacrylate is extruded by conventional means at a temperature from 200° F. to 680° F., although usually it is preferred not to exceed 450° F., thru a die into a carrier duct, which is from 6 to 60 inches in length and whose diameter is from 2 to 6 times the diameter of the extruded plastic strand, through which it passes concurrently with air having a pressure of from 50 to 150 lbs. per square inch. Extrusion may be advantageously effected by means of an extrusion machine having a screw diameter from 1 to 5 inches, a screw speed from 5 to 50 R. P. M., a die plate with from 1 to 12 orifices and the rate of feed of said composition being from 10 to 100 lbs. per hour.

As the term is used herein, a product is "strain-free and thermally stable," when it will change dimensionally less than 3% when heated in an unconfined state for 1–2 hours at a temperature at which the product is soft and rubbery. The freedom from strain of products made according to this invention has been further confirmed by examination of the products with crossed polarized light (cf. Ex. II).

An advantage of the present invention is that it provides a practical method for producing strain-free, thermally stable extruded shapes from organic thermoplastic materials. A further and particular advantage is that it provides an economical means of forming pellets of very uniform bulk density, size, and shape adapted for use as molding powder in any conventional method of molding.

As many apparently widely different embodiments of this invention may be made without departing from the spirit and scope thereof, it is to be understood that the invention is not limited to the specific embodiments thereof except as defined in the appended claims.

I claim:

1. A process of forming strain-free, thermally stable shapes from an organic thermoplastic material substantially free of volatile solvents, which process comprises extruding said thermoplastic material at elevated temperature in a body of continuous length into a duct and passing concurrently therewith through said duct a stream of inert gas having a temperature below the softening point of said thermoplastic material, the ratio of gas pressure in pounds per square inch at said duct entrance to the cross-sectional area in square inches of said duct being from 362:1 to 812:1 and the ratio of said cross-sectional area of said duct to the cross-sectional area of said extruded body being at least 2:1, and maintaining said extruded body in said duct until form-stable.

2. A process of forming strain-free, thermally stable shapes from an organic thermoplastic material substantially free of volatile solvents, which process comprises extruding said thermoplastic material at elevated temperature in a body of continuous length into a duct and passing concurrently therewith through said duct a stream of air of approximately room temperature, the ratio of air pressure in pounds per square inch at said duct entrance to the cross-sectional area in square inches of said duct being from 362:1 to 812:1 and the ratio of said cross-sectional area of said duct to the cross-sectional area of said extruded body being at least 2:1, and maintaining said extruded body in said duct until form-stable.

3. A process of forming strain-free, thermally stable shapes from a polymerized methyl methacrylate resin substantially free of volatile solvents, which process comprises extruding said resin at a temperature of 200° F. to 680° F. in a body of continuous length into a duct and passing concurrently therewith through said duct a stream of air of approximately room temperature, the ratio of air pressure in pounds per square inch at said duct entrance to the cross-sectional area in square inches of said duct being from 362:1 to 812:1 and the ratio of said cross-sectional area of said duct to the cross-sectional area of said extruded body being at least 2:1, and maintaining said extruded body in said duct until form-stable.

PAUL M. COLE.

REFERENCES CITED

The following references are of record in the file of this patent:

UNITED STATES PATENTS

| Number | Name | Date |
| --- | --- | --- |
| 1,317,157 | Dufee et al. | Sept. 30, 1919 |
| 2,245,640 | Beatee | June 17, 1941 |
| 2,252,684 | Babcock | Aug. 19, 1941 |
| 2,294,555 | Hendrie | Sept. 1, 1942 |
| 2,303,338 | Dreyfus et al. | Dec. 1, 1942 |
| 2,308,638 | Balthis et al. | Jan. 19, 1943 |
| 2,319,040 | Conklin | May 11, 1943 |